(12) United States Patent
Doany et al.

(10) Patent No.: US 9,411,106 B2
(45) Date of Patent: Aug. 9, 2016

(54) POLARIZATION-INDEPENDENT GRATING COUPLER FOR SILICON ON INSULATOR

(71) Applicant: International Business Machines Corporation, Armonk, NY (US)

(72) Inventors: Fuad E. Doany, Katonah, NY (US); Frank R. Libsch, White Plains, NY (US); Daniel P. Morris, Yorktown Heights, NY (US); Jeonghwan Song, Heverlee (BE)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/501,478

(22) Filed: Sep. 30, 2014

(65) Prior Publication Data

US 2016/0091664 A1   Mar. 31, 2016

(51) Int. Cl.
 *G02B 6/34* (2006.01)
(52) U.S. Cl.
 CPC ......................................... *G02B 6/34* (2013.01)
(58) Field of Classification Search
 CPC ..................................................... G02B 6/34
 See application file for complete search history.

(56) References Cited

U.S. PATENT DOCUMENTS

| | | | |
|---|---|---|---|
| 5,229,614 A | 7/1993 | Andersson et al. | |
| 5,495,543 A * | 2/1996 | Alferness | G02B 6/12007 385/37 |
| 6,101,302 A | 8/2000 | Park et al. | |
| 6,967,345 B1 | 11/2005 | Gunapala et al. | |
| 7,042,657 B2 | 5/2006 | MacFarlane | |
| 7,298,945 B2 | 11/2007 | Gunn, III et al. | |
| 2010/0265504 A1* | 10/2010 | Kopp | G02B 6/12002 356/364 |
| 2010/0322555 A1* | 12/2010 | Vermeulen | G02B 6/12007 385/28 |
| 2012/0224810 A1 | 9/2012 | Doerr | |

FOREIGN PATENT DOCUMENTS

WO      9964933 A1    12/1999

OTHER PUBLICATIONS

Z. Bai et al., "Efficient Near-Infrared Emission from Neodymium by Broadband Sensitization of Bismuth in Zeolites," Optics Letters, Mar. 2011, pp. 1017-1019, vol. 36, No. 6.
J.G. Castellóet al., "Real-Time Observation of Antigen-Antibody Association Using a Low-Cost Biosensing System Based on Photonic Bandgap Structures," Optics Letters, Sep. 2012, pp. 3684-3686, vol. 37, No. 17.
Y. Tang et al., "Proposal for a Grating Waveguide Serving as Both a Polarization Splitter and an Efficient Coupler for Silicon-on-Insulator Nanophotonic Circuits," IEEE Photonics Technology Letters, Feb. 2009, pp. 242-244, vol. 21, No. 4.
D. Taillaert et al., "Grating Couplers for Coupling Between Optical Fibers and Nanophotonic Waveguides," Japanese Journal of Applied Physics, Jan. 2006, pp. 6071-6077, vol. 45, No. 8A.

* cited by examiner

*Primary Examiner* — Omar R Rojas
(74) *Attorney, Agent, or Firm* — Daniel P. Morris; Ryan, Mason & Lewis, LLP

(57) ABSTRACT

A grating structure has a plurality of gratings. In one example, one or more of the gratings are configured: to be non-uniformly spaced with respect to one or more other ones of the gratings; and to optically couple a first light conduit and a second light conduit enabling light having a first polarization and light having a second polarization to pass through the grating structure and propagate in the same direction in the first light conduit or the second light conduit. The non-uniform spacing of the gratings may represent an intersection or a union of a period associated with the light having the first polarization and a period associated with the light having the second polarization.

20 Claims, 8 Drawing Sheets

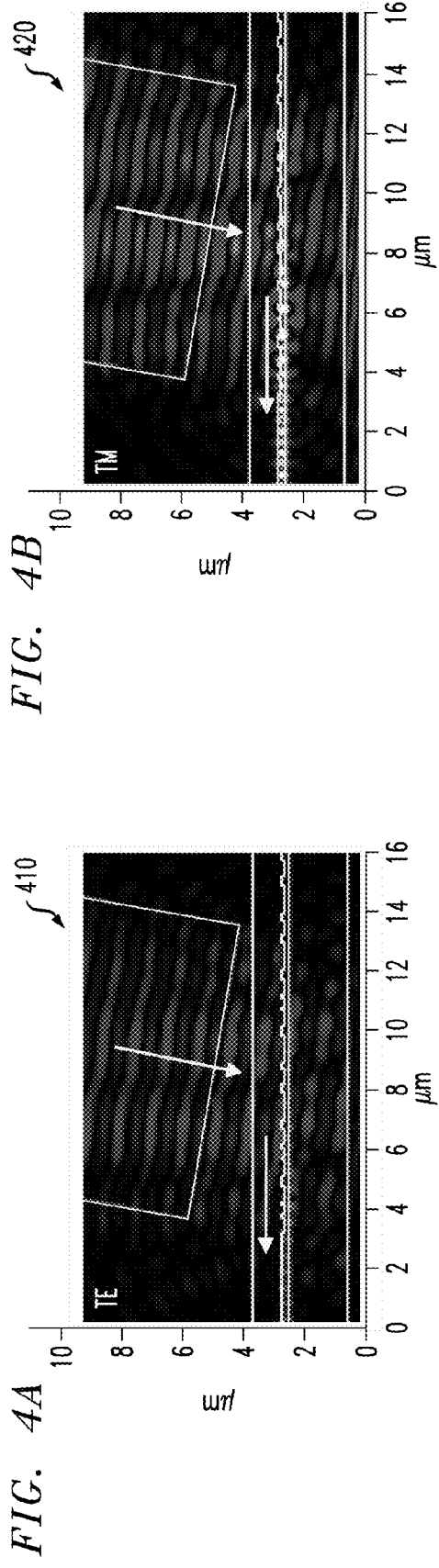

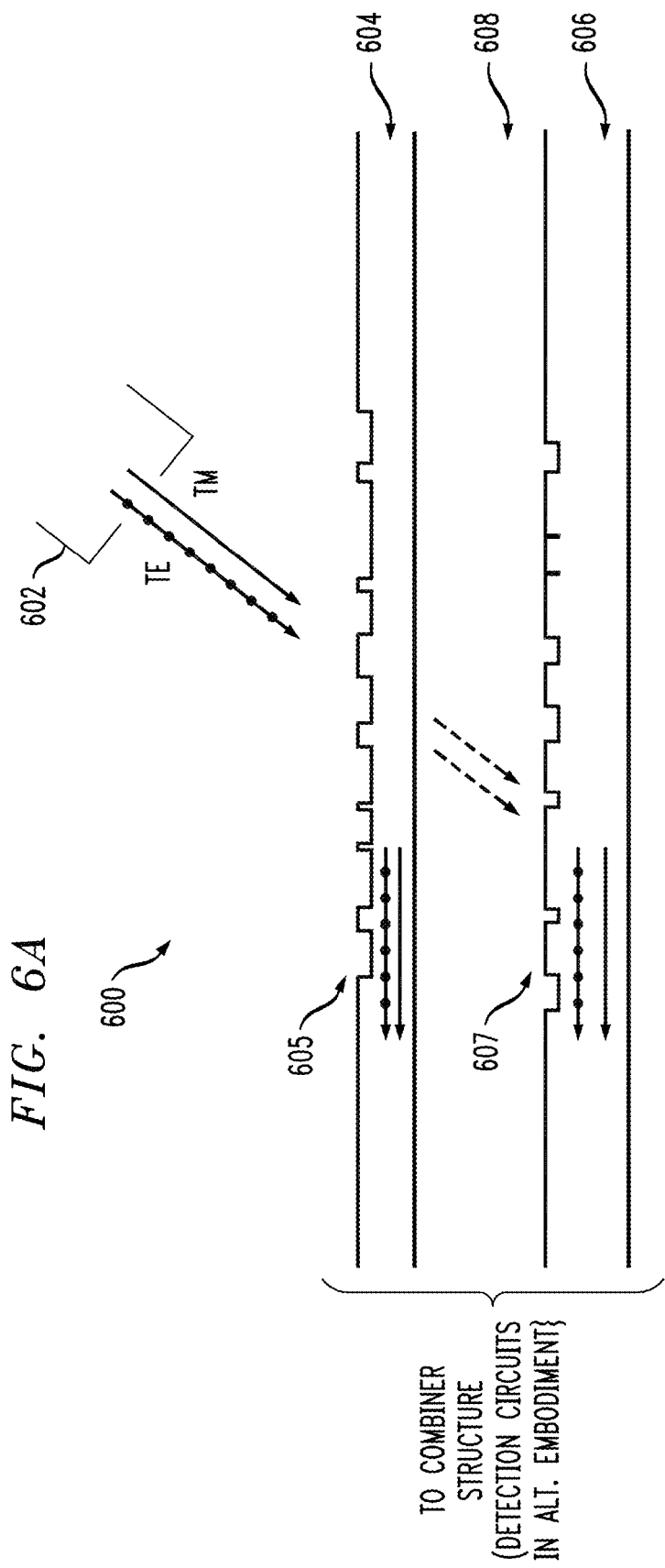

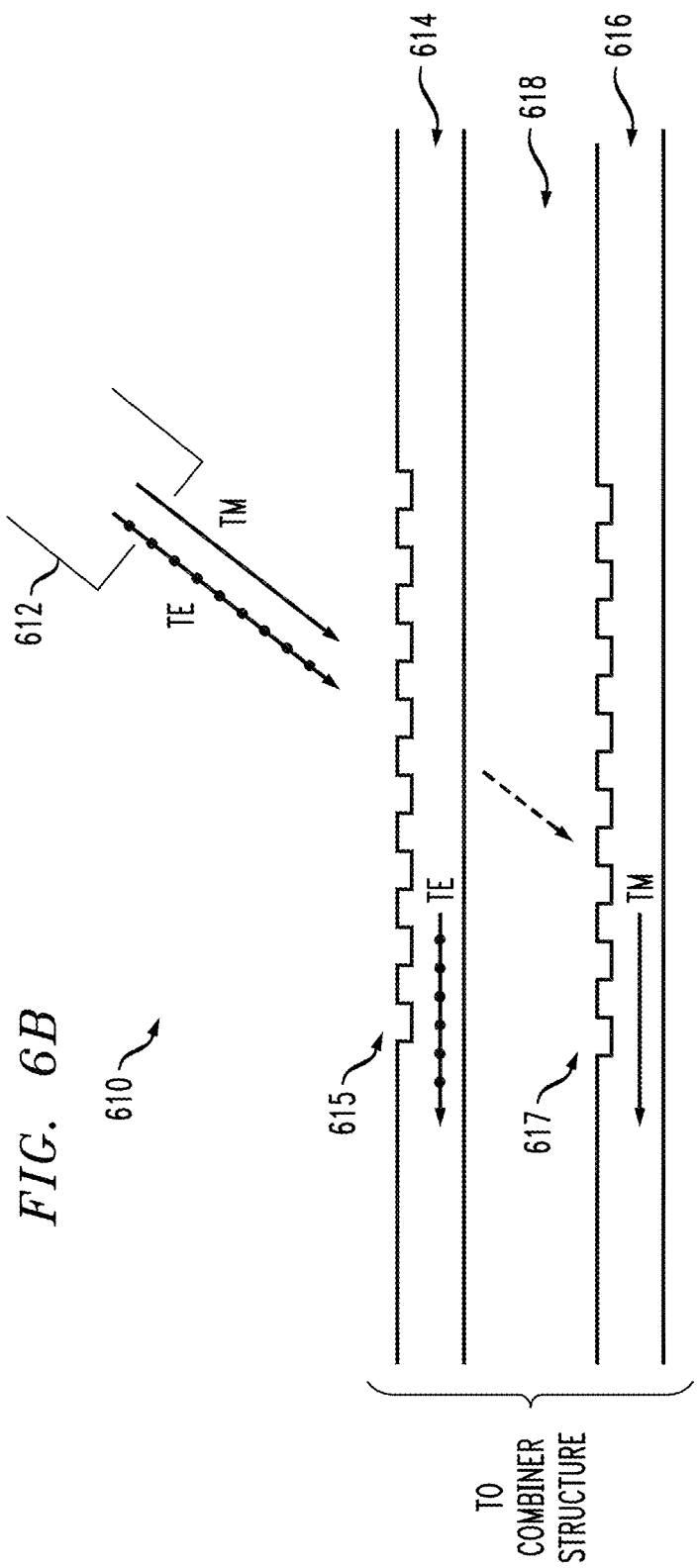

POLARIZATION-INDEPENDENT GRATING COUPLER FOR SILICON ON INSULATOR

FIELD

The field generally relates to optical couplers and, more particularly, to improved grating couplers.

BACKGROUND

Optical coupling between a single mode fiber (SMF) and a silicon planar waveguide is one of the key issues in photonic integrated circuits fabricated in silicon-on-insulator (SOI) technology due to mode mismatch arising from the significantly higher refractive index of the silicon planar waveguide compared to that of the SMF. Various types of mode size converters (i.e., optical couplers) have been proposed to address this mismatch issue such as, for example, taper structures and grating couplers.

The grating coupler provides surface coupling and can have large bandwidth up to several tens of nanometers. Such an optical coupler can be appropriate for functional wafer-scale testing of photonic integrated circuits during the fabrication process because there is no need to cleave or dice devices, which is required using edge-coupling (e.g., taper) structures. Furthermore, the grating couplers are not only useful for coupling light into an SMF but are also suitable for integrating surface mountable active devices, such as a photodiode and a vertical-cavity surface-emitting laser. However, existing grating couplers are strongly polarization-dependent due to their geometry. Several approaches have been proposed to overcome polarization-dependent limitations such as, for example, polarization splitting grating couplers (called two-dimensional or 2D gratings) with polarization diversity circuits, and the polarization-independent grating couplers for dual polarizations into a single silicon waveguide (called one-dimensional or 1D grating). The 2D grating coupler structure requires polarization diversity schemes such as complex polarization rotators or two identical functional devices without rotators, one for each polarization state. The schemes make the circuit more complicated and efficient polarization-independent fiber-to-chip coupling is still challenging. Therefore, simpler 1D grating couplers are preferable.

The 1D grating coupler approach has been proposed for the waveguide on a SOI wafer such as using thick silicon waveguides, using double etched gratings, or using double surface corrugation. The refractive index contrast ($\Delta$) of a silicon waveguide, defined as $(n_{core}^2 - n_{clad}^2)/2n_{core}^2$ is ~48%, where core refers to thin glass center of the optical fiber where light travels, and clad or cladding refers to the outer optical material surrounding the core that reflects light back into the core. For single mode operation with this $\Delta$, the typical size of silicon waveguide is approximately 400 nm by 220 nm in width and thickness, respectively. Waveguide thickness greater than 220 nm may not provide single mode operation even though the grating coupler formed with the thick-waveguide can have better coupling efficiency and design flexibility. Designs based on double etched grating and double surface corrugation are undesirable due to the complicated fabrication process.

SUMMARY

Illustrative embodiments of the invention provide techniques for improved grating couplers.

For example, in one embodiment, a grating structure has a plurality of gratings. One or more of the gratings are configured: to be non-uniformly spaced with respect to one or more other ones of the gratings; and to optically couple a first light conduit and a second light conduit enabling light having a first polarization and light having a second polarization to pass through the grating structure and propagate in the same direction in the first light conduit or the second light conduit. The non-uniform spacing of the gratings may represent an intersection or a union of a period associated with the light having the first polarization and a period associated with the light having the second polarization.

Advantageously, illustrative grating coupler embodiments provide for two polarization states, transverse-electric (TE) polarized light and transverse-magnetic (TM) polarized light, to be diffracted so that the dual polarized light propagates in the same direction in a fiber or a waveguide.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIGS. 4A and 4B illustrate field plots of polarization-independent intersection grating couplers according to embodiments of the invention.

FIGS. 4C and 4D illustrate field plots of polarization-independent union grating couplers according to embodiments of the invention.

FIG. 6A illustrates polarization-independent grating coupling using non-uniform grating structures in a two-layer waveguide arrangement according to yet another embodiment of the invention.

FIG. 6B illustrates polarization-independent grating coupling using uniform grating structures in a two-layer waveguide arrangement according to a further embodiment of the invention.

DETAILED DESCRIPTION

Illustrative embodiments provide one-dimensional (1D) grating couplers with polarization-independent fiber coupling using gratings with non-uniform periodicity. The non-uniform periods are formed by the mathematical intersection or union of a set of two different grating periods. Unlike prior polarization-independent 1D grating couplers, illustrative embodiments achieve 220 nm waveguide thickness for design and optimization while simultaneously accounting for single mode fiber operation and simple fabrication process steps. Non-limiting examples of waveguides with which illustrative embodiments can be implemented are nanophotonic waveguides such as photonic-wire or photonic-crystal waveguides.

It is to be understood that the terms "intersection" and "union" refer to conventional algebraic functions according to mathematics set theory. Also, as used herein, a "light conduit" refers to an element, device, structure, or the like, through which light passes, by way of example only, an optical fiber or an optical waveguide. By way of another example, an optical lens, or the like, used to direct a light source (e.g., laser) toward a grating structure may be considered a light conduit.

Figure 1A:
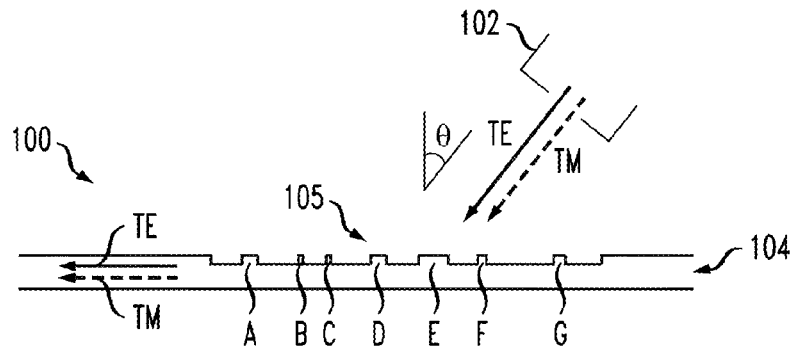
FIG. 1A illustrates polarization-independent grating coupling using a non-uniform grating structure according to one embodiment of the invention.
Figure 1B:
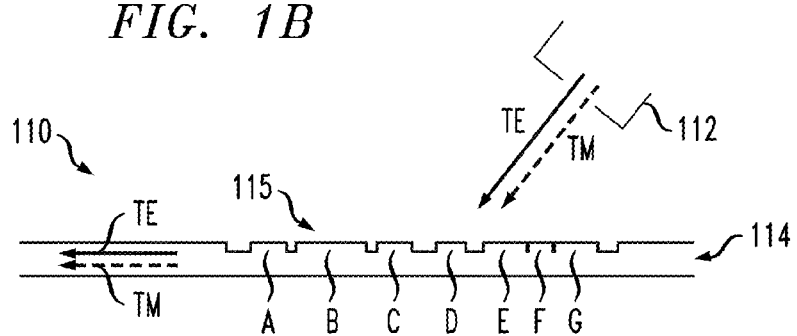
FIG. 1B illustrates polarization-independent grating coupling using a non-uniform grating structure according to another embodiment of the invention.

FIGS. 1A and 1B show polarization-independent grating couplers having non-uniform gratings according to illustrative embodiments. Device 100 in FIG. 1A shows optical fiber 102 grating-coupled to waveguide 104 with a first non-uniform grating structure 105. Device 110 in FIG. 1B shows optical fiber 112 grating-coupled to waveguide 114 with a second non-uniform grating structure 115. Not specifically shown in the figures below the waveguide layer, but understood to be present in these illustrative embodiments, is a silicon dioxide ($SiO_2$) or buried oxide (BOX) insulating layer and below that a Si substrate layer, which collectively make up main layers of the SOI device. Note that an example of an SOI device according to an illustrative embodiment will be described below in the context of FIG. 7.

Figure 1C:
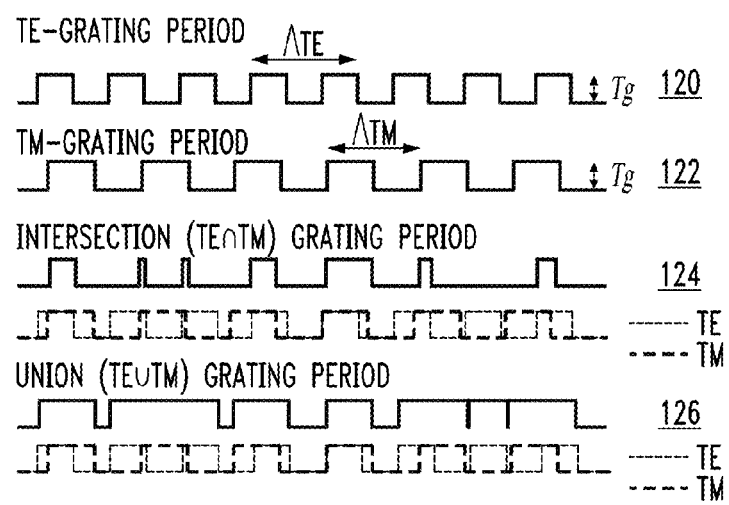
FIG. 1C illustrates non-uniform grating periods from intersection and union, respectively, of transverse-electric and transverse-magnetic mode grating periods according to one embodiment of the invention.

To compose non-uniform gratings, the intersection or union of two grating periods is used as shown in FIG. 1C. The non-uniform gratings from either the intersection or union of two different grating periods are designated as an intersection grating and a union grating, respectively, for convenience. Illustrative embodiments use the near optimal transverse-electric (TE) grating period 120 and the near optimal transverse-magnetic (TM) grating period 122 as a set of two different grating periods for the formation of non-uniform gratings.

Grating period 124 represents the intersection of TE grating period 120 and TM grating period 122. Thus, the gratings or grating teeth (A through G) of non-uniform grating structure 105 correspond to grating period 124. That is, the non-uniform spacing of gratings A-G are formed to replicate the resulting non-uniform periodicity of the intersection of TE grating period 120 and TM grating period 122. Grating period 120 is optimized for TE polarization with a period of $\Lambda_{TE}$, while grating period 122 is optimized for TM polarization with period $\Lambda_{TM}$. The gratings are formed by etching and filling the grating structure material, using known etching and filling techniques, such that the grating structure corresponds to the intersection of the grating periods of the two polarization modes (TE and TM). For example, the grating structure 105 may be formed by the intersection (a common overlap) of at least two different 1-D grating structures, each having a different uniform period.

Grating period 126 represents the union of TE grating period 120 and TM grating period 122. Thus, the gratings or grating teeth (A through G) of non-uniform grating structure 115 correspond to grating period 126. That is, the non-uniform spacing of gratings A-G are formed to replicate the resulting non-uniform periodicity of the union of TE grating period 120 and TM grating period 122. Again, the gratings are formed by etching and filling the grating structure material, using known etching and filling techniques, such that the grating structure corresponds to the union of the grating periods of the two polarization modes (TE and TM). For example, the grating structure 115 may be formed by the union (a sum) of at least two different 1-D grating structures, each having a different uniform period.

The uniform grating periods for the TE and TM mode coupling at a given wavelength ($\lambda$) and a fiber coupling angle ($\theta$) with respect to vertical can be obtained by the phase matching condition as $kn_{eff}^{TE/TM} = kn_{clad} \sin\theta + q2\pi/\Lambda^{TE/TM}$, where $k=2\pi/\lambda$, q is the diffraction order, $n_{eff}^{TE/TM}$ is the mean effective index along one grating period for TE and TM, respectively, $n_{clad}$ is the refractive index of the cladding (e.g., $SiO_2$ with index$\approx$1.45), and $\Lambda^{TE/TM}$ is the grating period for TE and TM, respectively.

Assume that the intersection and union grating couplers have changed values of the propagation constants in comparison to those from each of optimal TE and TM grating couplers. Also, they have common characteristics such as diffraction angles because the non-uniform gratings originate from the combination of each of near optimal TE and TM grating periods. Due to these common characteristics, the non-uniform grating couplers show similar diffraction angles as the optimal TE and TM couplers. It is therefore possible to optimize the coupler for polarization-independent coupling. The changed values of propagation constants result in optical loss. Thus, the optimal TE and TM grating periods are identified as a starting point to explore the range of design parameters of the resulting non-uniform gratings.

Figure 2:
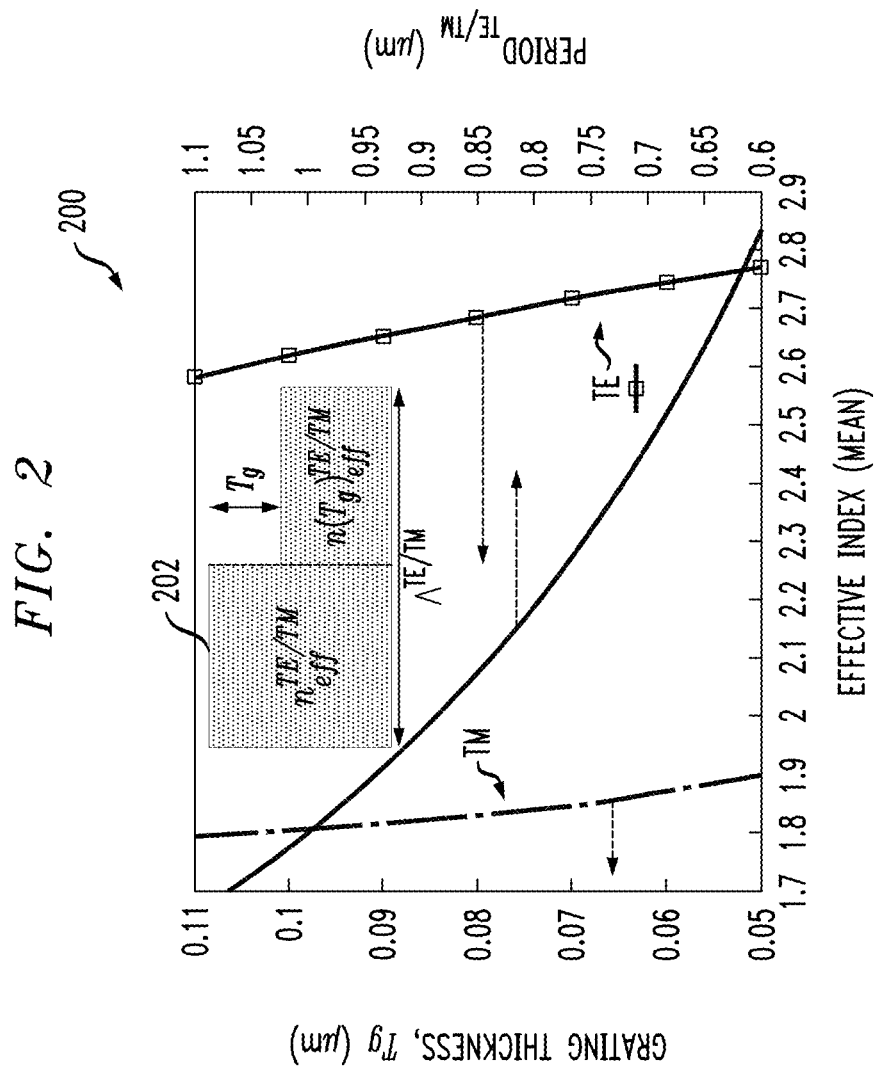
FIG. 2 illustrates a plot of effective index, versus optimal grating periods according to one embodiment of the invention.

FIG. 2 shows a plot 200 of the mean effective index along one grating period of TE and TM modes corresponding to $[n_{eff}^{TE/TM} + n(T_g)_{eff}^{TE/TM}]/2$ versus the grating period and thickness. The effective index for TE and TM modes as a function of grating thickness is calculated by a finite difference mode (FDM) simulation solver. The grating periods are plotted using the above-mentioned phase matching condition. The FDM simulation for effective index is implemented using the silicon waveguide area of 12 µm×0.22 µm, the core index of 3.5, the given wavelength of 1.55 µm, and fiber coupling angle of 10-degree tilt. The optimal TE and TM, mode grating periods are near 620 nm and 950 nm with respect to the range of effective index of 2.6 to 2.8 and 1.8 and 1.9, respectively. The range of the grating etch depth is from 50 nm to 110 nm for both the TE and TM modes.

As shown in FIG. 2, the gap between effective index of TE and TM modes is significantly large such that a common grating period is non-existent within 220 nm waveguide thickness. However, it is possible to be matched between two mean effective indexes of TE and TM modes on the non-uniform grating period.

For the non-uniform grating coupler design in accordance with an illustrative embodiment, the waveguide parameters used are the same values as for commercial SOI wafer with the silicon layer of 220 nm as a core and the buried oxide (BOX) layer of 2 µm as a bottom cladding. The use of parameters from a commercial SOI wafer simplify the fabrication process. The fiber coupling angle and the center wavelength have been fixed at 10 degrees and 1.55 µm, respectively. The interface between fiber and grating coupler is index-matched at 1.45. For simplicity, 50% duty cycle has been adopted for the individual TE and TM gratings, as depicted in FIG. 1(c). Since the non-uniform grating structure has a lateral geometry, accurate calculation can be obtained by 2-D modeling. The simulation based on 2-D finite element frequency domain (FEFD) method has been implemented with variation in the two grating periods (TE, TM) and variation in the etch depth.

Note that the shaded inset 202 in plot 200 of FIG. 2 shows one grating period for calculating the mean effective index.

Figure 3A:
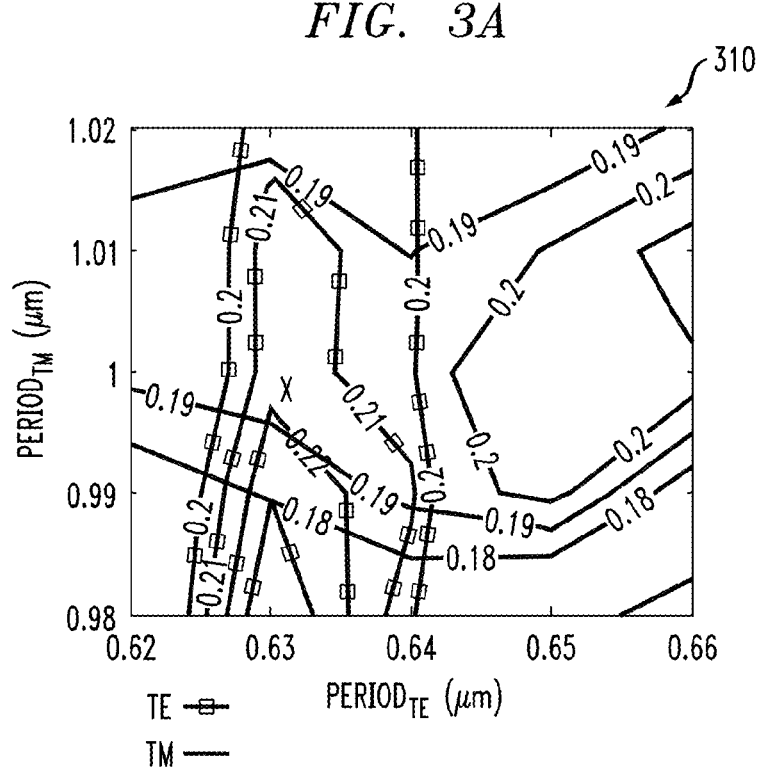
FIGS. 3A and 3B illustrate contour maps for optimization of two periods for intersection grating and union grating, respectively, according to embodiments of the invention.
Figure 3B:
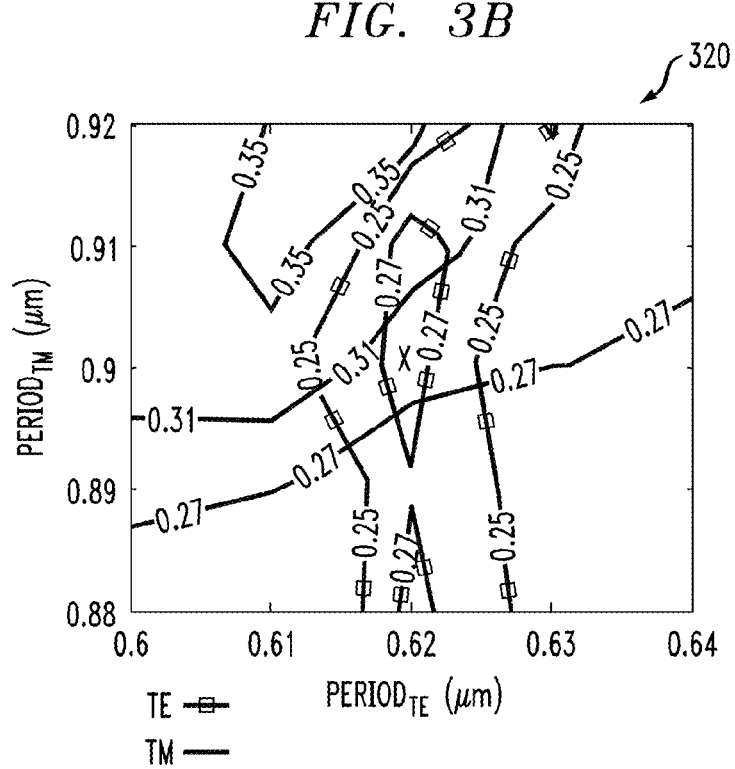

FIGS. 3A and 3B show contour plots of calculated coupling efficiency of the combination grating as a function of TE and TM grating pitches. Plot 310 in FIG. 3A is a contour map for an intersection grating, and plot 320 in FIG. 3B is a contour map for a union grating. From these plots, the grating periods providing optimum performance (identical coupling efficiency) for both TE and TM polarizations for the intersection and union gratings can be identified. The optimal TE/TM periods are 630 nm/1000 nm for the intersection grating and 620 nm/900 nm for the union grating, as shown in plot 310 and plot 320, respectively. Note that X denotes the optimized two periods for intersection and union grating formations where identical coupling efficiency is achieved for TE and TM polarization. The etch depth of the gratings was also varied and optimized at 60 nm and 100 nm for preferred intersection and union gratings, respectively.

FIGS. 4A and 4B illustrate field plots of polarization-independent intersection grating couplers according to illustrative embodiments (plot 410 for TE mode and plot 420 for TM mode), while FIGS. 4C and 4D illustrate field plots of polarization-independent union grating couplers according to illustrative embodiments (plot 430 for TE mode and plot 440 for TM mode). More particularly, the illustrated field plots represent grating couplers according to illustrative embodiments when the grating couplers have optimal parameters. Further, the illustrated field plots show dual polarized lights from a SMF propagate into a silicon waveguide.

Figure 5A:
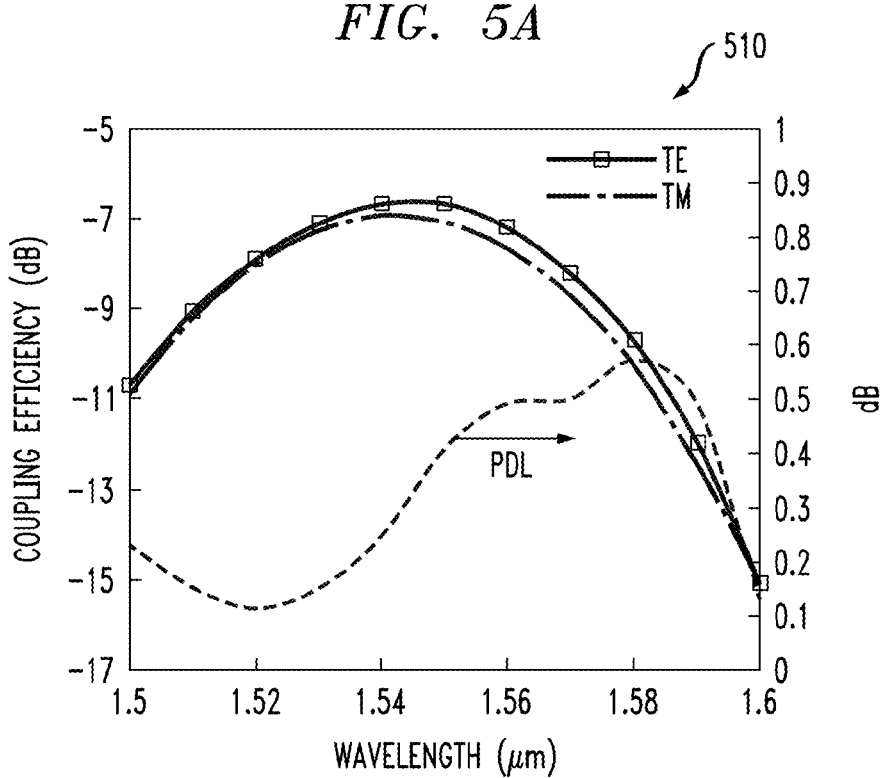
FIG. 5A illustrates a plot of fiber coupling performance of optimized intersection gratings according to one embodiment of the invention.
Figure 5B:
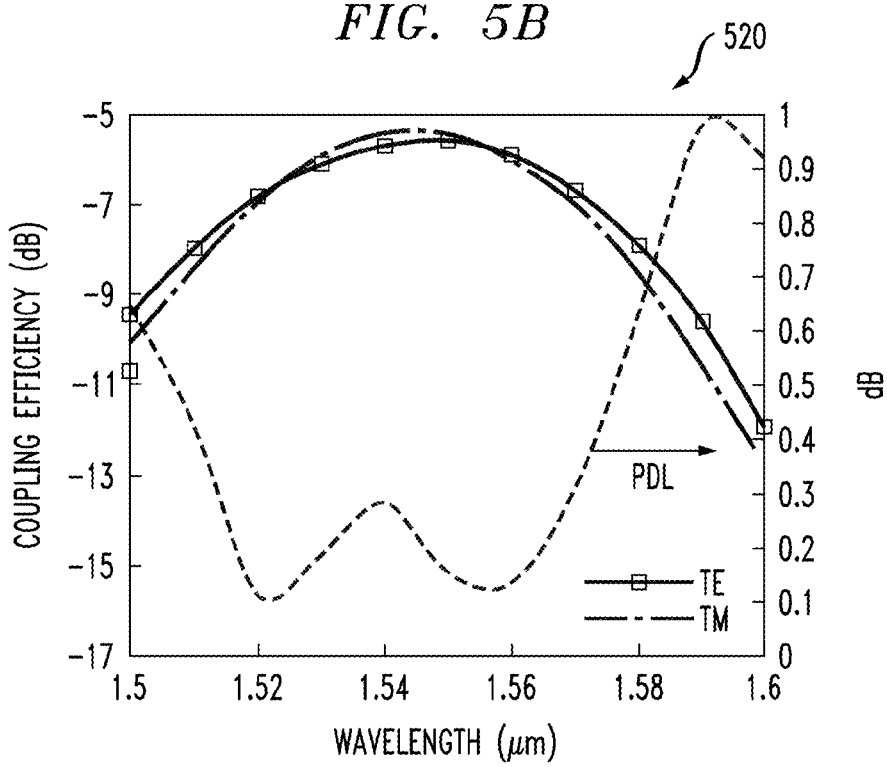
FIG. 5B illustrates a plot of fiber coupling performance of optimized union gratings according to one embodiment of the invention.

FIGS. 5A and 5B illustrate plots of fiber coupling performance of optimized intersection gratings (plot 510) and optimized union gratings (plot 520), respectively, according to illustrative embodiments. More particularly, plots 510 and 520 show fiber coupling efficiencies and polarization dependent loss (PDL) values. Evident in 510 and 520 is the nearly identical coupling efficiency for TE and TM polarizations, which is achieved for both intersection and union grating couplers over a broad wavelength range. The intersection and union grating couplers have coupling efficiencies of −6.9 dB and −5.4 dB at the wavelength of 1.55 nm, respectively. For comparison, the coupling efficiency of the optimal TE or TM uniform grating coupler is approximately −3.5 dB with the same design parameters. The maximum PDL value of the intersection grating coupler is 0.57 dB in the range of 1.5 nm to 1.6 nm. For the union grating coupler, all PDL values within 3 dB-bandwidth are less than 0.5 dB. The non-uniform grating couplers are polarization independent and have ~2 dB lower coupling efficiencies than each of the optimal TE and TM grating couplers. Further optimization of the gratings, including applying apodization, fine controlling of BOX layer thickness, and embedding a bottom mirror, can be employed to further improve coupling efficiencies. For example, initial simulations show 2.5 dB improvement in coupling efficiency for the union grating when a bottom mirror is incorporated under the 2 μm-BOX layer. Moreover, the fiber coupling efficiency of the grating coupler having thickness of greater than 220 nm is significantly increased. The 1 dB-bandwidth of both of the grating couplers is approximately 40 nm.

FIG. 6A illustrates polarization-independent grating coupling using non-uniform grating structures in a two-layer waveguide arrangement according to yet another embodiment of the invention. Device 600 in FIG. 6A shows optical fiber 602 grating-coupled to a first waveguide 604 with a first non-uniform grating structure 605 and a second waveguide 606 with a second non-uniform grating structure 607. The two grating/waveguide structures are separated, in this illustrative embodiment, by an oxide (or nitride) layer 608. Not specifically shown in the figures below the waveguide layers, but understood to be present in this illustrative embodiment, is a silicon dioxide ($SiO_2$) or buried oxide (BOX) insulating layer and below that a Si substrate layer, which collectively make up main layers of the SOI device. It is to be appreciated that adding a second waveguide layer and grating (i.e., 606 and 607) with a period and duty cycle tuned to diffract the light not diffracted by the first waveguide layer and grating (i.e., 604 and 606), also referred to as the lost light (TM and TE), in the same direction as the first grating. The light diffracted by the first and second gratings are combined by a waveguide combiner structure, such as a multimode waveguide combiner, to the left in the figure (not expressly shown) to form combined diffracted light. Another embodiment provides for directing the light from the two layers to identical detection circuits (optical-to-electrical detection), and combining the detected (electrical) signals to provide improved efficiency/sensitivity.

FIG. 6B illustrates polarization-independent grating coupling using uniform (as shown) or non-uniform (not expressly shown) grating structures in a two-layer waveguide arrangement according to a further embodiment of the invention. Device 610 in FIG. 6B shows optical fiber 612 grating-coupled to a first waveguide 614 with a first uniform grating structure 615 (representing grating period 120 optimized for TE polarization with a period of $\Lambda_{TE}$ from FIG. 1C) and a second waveguide 616 with a second uniform grating structure 617 (representing grating period 122 optimized for TM polarization with period $\Lambda_{TM}$ from FIG. 1C). The two grating/waveguide structures are separated, in this illustrative embodiment, by an oxide (or nitride) layer 618. Not specifically shown in the figures below the waveguide layers, but understood to be present in this illustrative embodiment, is a silicon dioxide ($SiO_2$) or buried oxide (BOX) insulating layer and below that a Si substrate layer, which collectively make up main layers of the SOI device. In this embodiment, the first grating 615 is tuned to only diffract the TE or TM mode, and the second grating 617 is tuned to only diffract the other of the TE or TM mode. When a single mode is diffracted, there is increased efficiency. Thus, each grating layer is optimized for one polarization. Then, the two waveguides layers are combined with a combiner structure (not expressly shown) such as a polarization rotator structure. This embodiment provides a method of providing equal amounts of TE and TM, although each through different structures.

Both two-waveguide layer approaches in FIGS. 6A and 6B advantageously improve efficiency/sensitivity for the SOI device. Furthermore, in alternative embodiments to the embodiments shown in FIGS. 6A and 6B, there can be more than two grating/waveguide structures. That is, it is realized that light can leak through the bottom structure. Another one or more such structures can be added to maximize the light captured. By way of example only, maximizing the light captured may be critical in a scientific instrument where it is critical to optimize a weak signal that is being measured.

Figure 7:
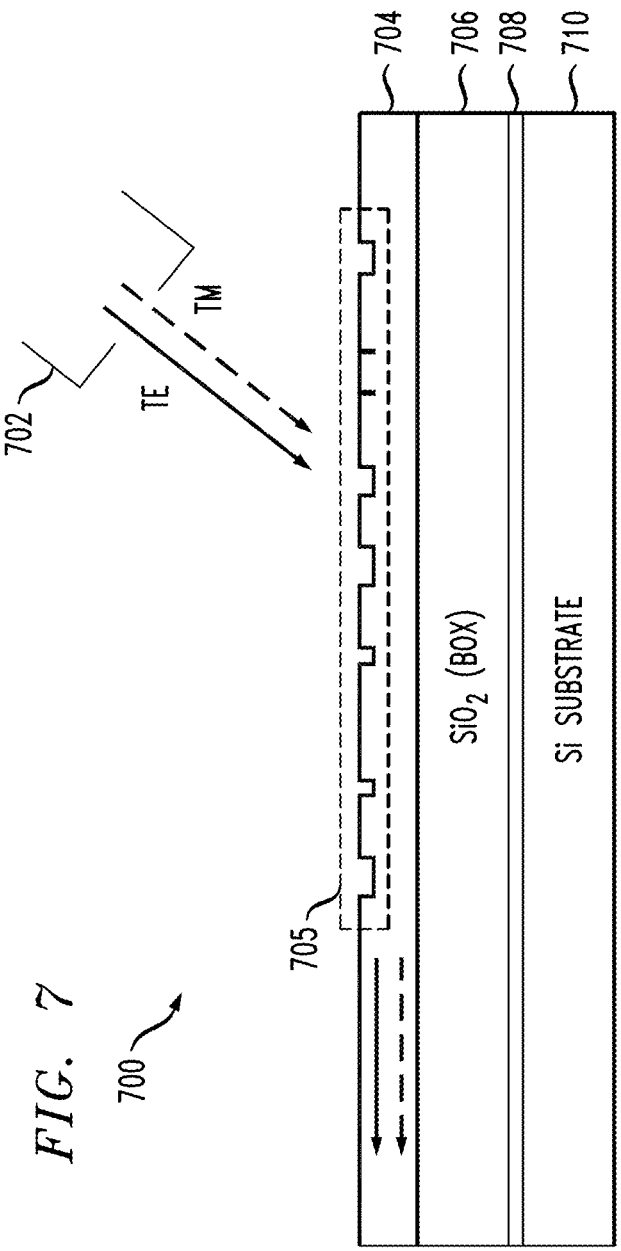
FIG. 7 illustrates a silicon-on-insulator device according to one embodiment of the invention.

FIG. 7 illustrates one example of an SOI device formed according to one illustrative embodiment. By way of example only, such an SOI device may be used for an Si photonic circuit.

Device 700 in FIG. 7 shows optical fiber 702 grating-coupled to waveguide 704 with a non-uniform grating structure 705 formed in accordance with one or more embodiments. Below the waveguide layer is a silicon dioxide ($SiO_2$)

or buried oxide (BOX) insulating layer 706. Below the BOX layer 706 is a reflecting element layer (e.g., mirror as mentioned above) 708. Below the reflecting element layer 708 is a Si substrate layer 710. The reflecting element 708 is used to redirect light transmitted by grating structure 705 back toward the grating coupler. This reflected light can also be coupled into waveguide 704 by grating structure 705 thus improving the overall coupling efficiency.

In one illustrative embodiment, the grating structure 705 and waveguide 704 are formed in the Si substrate layer. The grating structure 705 may be formed, by way of example only, using silicon nitride (SiN), silicon oxynitride (SiON), polysilicon (Poly-Si), silicon (Si), or a combination of said materials. The waveguide 704 may be formed, by way of example only, using SiN, SiON, Poly-Si, Si, or a combination of said materials. The waveguide 704 illustratively referred to herein is a light guiding core structure surrounded by a lower index clad material such as $SiO_2$ (BOX layer 706). The reflecting element 708 is incorporated below the grating structure (e.g., between layers 708 and 710) for high coupling efficiency. The reflecting element may be, by way of example only, a total internal reflecting mirror, a metal mirror or dielectric mirror.

Accordingly, illustrative embodiments described herein provide non-uniform grating coupler structures for polarization-independent fiber coupling. The non-uniform periodicities are composed of the intersection or union of a set of two grating pitches which are near optimal grating periods of the individual TE and TM modes. Illustrative optimized designs show suitable fiber coupling performance and relatively low PDL within 3 dB-bandwidth. With the consideration of practical use, design parameters were illustratively used for the specification of commercially available SOI wafers.

It is to be appreciated that while illustrative embodiments depicted herein describe grating structures that optically couple light from a fiber to a waveguide, the grating structures also optically couple light from a waveguide to a fiber.

Although illustrative embodiments have been described herein with reference to the accompanying drawings, it is to be understood that the inventions are not limited to those precise embodiments, and that various other changes and modifications may be made by one skilled in the art without departing from the scope or spirit of the inventions.

What is claimed is:

1. An apparatus, comprising:
   a grating structure having a plurality of gratings;
   wherein one or more of the gratings are configured: to be non-uniformly spaced with respect to one or more other ones of the gratings; and to optically couple a first light conduit and a second light conduit enabling light having a first polarization and light having a second polarization to pass through the grating structure and propagate in the same direction in one of the first light conduit and the second light conduit;
   wherein the non-uniform spacing of the gratings represents one of:
      an intersection of a first grating period associated with the light having the first polarization and a second grating period associated with the light having the second polarization; and
      a union of the first grating period associated with light having the first polarization and the second grating period associated with light having the second polarization; and
   wherein the first grating period and the second grating period are different.

2. The apparatus of claim 1, wherein the non-uniform spacing of the gratings represents the intersection of the first grating period associated with the light having the first polarization and the second grating period associated with the light having the second polarization.

3. The apparatus of claim 1, wherein the non-uniform spacing of the gratings represents the union of the first grating period associated with light having the first polarization and the second grating period associated with light having the second polarization.

4. The apparatus of claim 1, wherein the grating structure is a one-dimensional grating structure.

5. The apparatus of claim 4, wherein the one-dimensional grating structure has a non-uniform periodicity and the structure is formed to represent a common overlap of at least two different one dimensional grating structures, each having a different uniform period.

6. The apparatus of claim 4, wherein the one-dimensional grating structure has a non-uniform periodicity and the structure is formed to represent a sum of at least two different one-dimensional grating structures, each having a different uniform period.

7. The apparatus of claim 1, wherein the light having the first polarization comprises transverse-electric polarized light.

8. The apparatus of claim 1, wherein the light having the second polarization comprises transverse-magnetic polarized light.

9. An apparatus, comprising:
   a first grating structure having a plurality of gratings; and
   a second grating structure having a plurality of gratings;
   wherein one or more of the gratings of the first grating structure are configured: to be non-uniformly spaced with respect to one or more other ones of the gratings; and to optically couple a first light conduit and a second light conduit enabling light having a first polarization and light having a second polarization to pass through the first grating structure and propagate in the same direction in the second light conduit;
   wherein one or more of the gratings of the second grating structure are configured: to be non-uniformly spaced with respect to one or more other ones of the gratings; and to optically couple the first light conduit and a third light conduit enabling light having the first polarization and light having the second polarization, that is not diffracted by the first grating structure, to pass through the second grating structure and propagate in the same direction in the third light conduit;
   wherein the non-uniform spacing of the gratings of the first grating structure represents one of:
      an intersection of a first grating period associated with the light having the first polarization and a second grating period associated with the light having the second polarization; and
      a union of the first grating period associated with light having the first polarization and the second grating period associated with light having the second polarization; and
   wherein the first grating period and the second grating period are different.

10. The apparatus of claim 9, wherein the non-uniform spacing of the gratings of the second grating structure represents the other one of:
   the intersection of the first grating period associated with the light having the first polarization and the second grating period associated with the light having the second polarization; and the union of the first grating period associated with the light having the first polarization and the second grating period associated with the light having the second polarization.

11. An apparatus, comprising:
a first grating structure having a plurality of gratings; and
a second grating structure having a plurality of gratings;
wherein one or more of the gratings of the first grating structure are configured: to be non-uniformly spaced with respect to one or more other ones of the gratings; and to optically couple a first light conduit and a second light conduit enabling light having a first polarization to pass through the first grating structure and propagate in the second light conduit;
wherein one or more of the gratings of the second grating structure are configured: to be one of uniformly and non-uniformly spaced with respect to one or more other ones of the gratings; and to optically couple the first light conduit and a third light conduit enabling light having a second polarization to pass through the second grating structure and propagate in the third light conduit in the same direction as the light propagates in the second light conduit;
wherein the non-uniform spacing of the gratings of the first grating structure represents one of:
    an intersection of a first grating period associated with the light having the first polarization and a second grating period associated with the light having the second polarization; and
    a union of the first grating period associated with light having the first polarization and the second grating period associated with light having the second polarization; and
wherein the first grating period and the second grating period are different.

12. The apparatus of claim 11, wherein the first grating period is optimized for the light having the first polarization and the second grating period is optimized for the light having the second polarization.

13. A system, comprising:
a first light conduit; and
an optical coupler comprising a grating structure having a plurality of gratings, wherein one or more of the gratings are configured: to be non-uniformly spaced with respect to one or more other ones of the gratings; and to optically couple the first light conduit and a second light conduit enabling light having a first polarization and light having a second polarization to pass through the grating structure and propagate in the same direction in one of the first light conduit and the second light conduit;
wherein the non-uniform spacing of the gratings represents one of:
    an intersection of a first grating period associated with the light having the first polarization and a second grating period associated with the light having the second polarization; and
    a union of the first grating period associated with light having the first polarization and the second grating period associated with light having the second polarization; and
wherein the first grating period and the second grating period are different.

14. The system of claim 13, further comprising a buried oxide insulating layer below the first light conduit.

15. The system of claim 14, further comprising a substrate layer below the buried oxide insulating layer.

16. The system of claim 15, further comprising a reflecting element layer between the buried oxide insulating layer and the substrate layer.

17. The system of claim 13, wherein the system is part of a silicon-on-insulator device.

18. The system of claim 13, wherein the non-uniform spacing of the gratings represents the intersection of the first grating period associated with the light having the first polarization and the second grating period associated with the light having the second polarization.

19. The system of claim 13, wherein the non-uniform spacing of the gratings represents the union of the first grating period associated with light having the first polarization and the second grating period associated with light having the second polarization.

20. The system of claim 13, wherein the light having the first polarization comprises transverse-electric polarized light, and the light having the second polarization comprises transverse-magnetic polarized light.

* * * * *